United States Patent [19]
Hettenbach

[11] Patent Number: 5,354,079
[45] Date of Patent: Oct. 11, 1994

[54] NESTABLE ADJUSTABLE STROLLER

[75] Inventor: Stephen Hettenbach, San Francisco, Calif.

[73] Assignee: The Taubman Company Limited Partnership, Bloomfield Hills, Mich.

[21] Appl. No.: 1,494

[22] Filed: Jan. 7, 1993

[51] Int. Cl.$^5$ ............................................. B62B 7/06
[52] U.S. Cl. ........................... 280/33.991; 280/33.993; 280/33.996; 280/658; 280/47.38; 297/239
[58] Field of Search ................ 280/33.991, 33.993, 280/33.996, 33.998, , 652, 657, 658, 47.38, 639, 35, 651; 297/DIG. 4, 234, 240, 241, 239

[56] References Cited
U.S. PATENT DOCUMENTS

| | | | |
|---|---|---|---|
| 3,497,234 | 2/1970 | Schray | 280/33.993 |
| 3,885,806 | 5/1975 | Trubiano | 280/33.993 |
| 4,072,318 | 2/1978 | Laune | 280/42 |
| 4,116,456 | 9/1978 | Stover et al. | 280/33.993 |
| 4,805,928 | 2/1989 | Nakao et al. | 280/642 |

Primary Examiner—Richard M. Camby
Attorney, Agent, or Firm—Heller, Ehrman, White & McAuliffe

[57] ABSTRACT

A nestable adjustable stroller having a chassis with upper and lower crossbars and a seat having a series of ribs on the bottom and a hanger bracket mounted on the back. In the seating position the back of the seat rests against the upper crossbar, and the lower crossbar rests in a groove between a pair of ribs at the bottom of the seat, the orientation of the seat being determined by which groove the lower crossbar rests in. A child restraint bar may be pivoted into a depression formed in the chair when not in use. To prepare the stroller for nesting the restraint bar is stored in the depression, and the seat is raised so that a crook in the hanger bracket rests on the upper crossbar. The stroller may be provided with a storage bag which hangs from the back of the stroller near the handle and collapses on nesting.

13 Claims, 5 Drawing Sheets

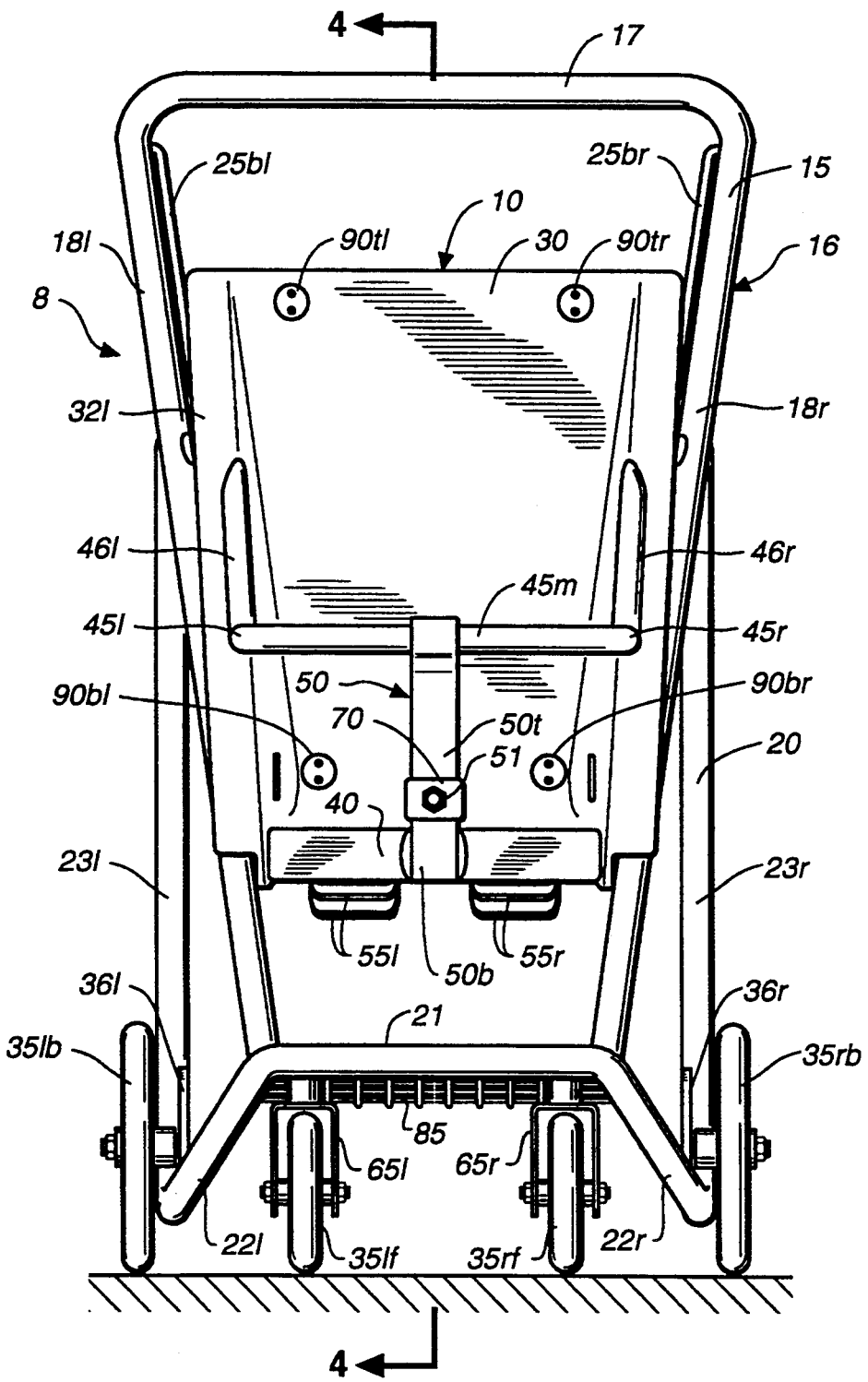
FIG._1

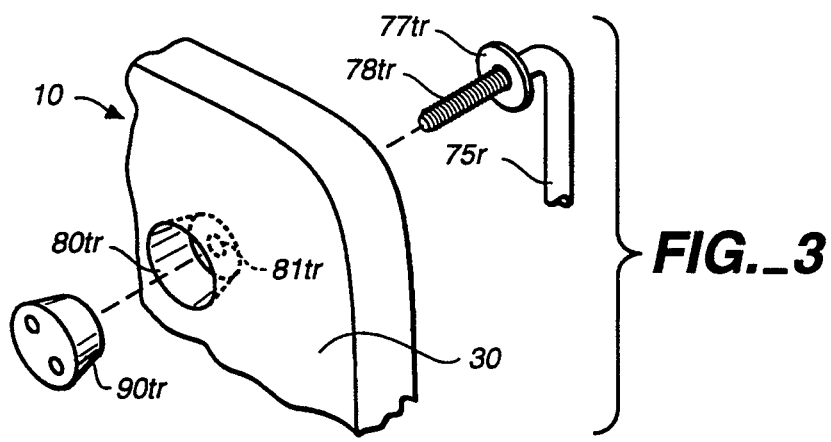
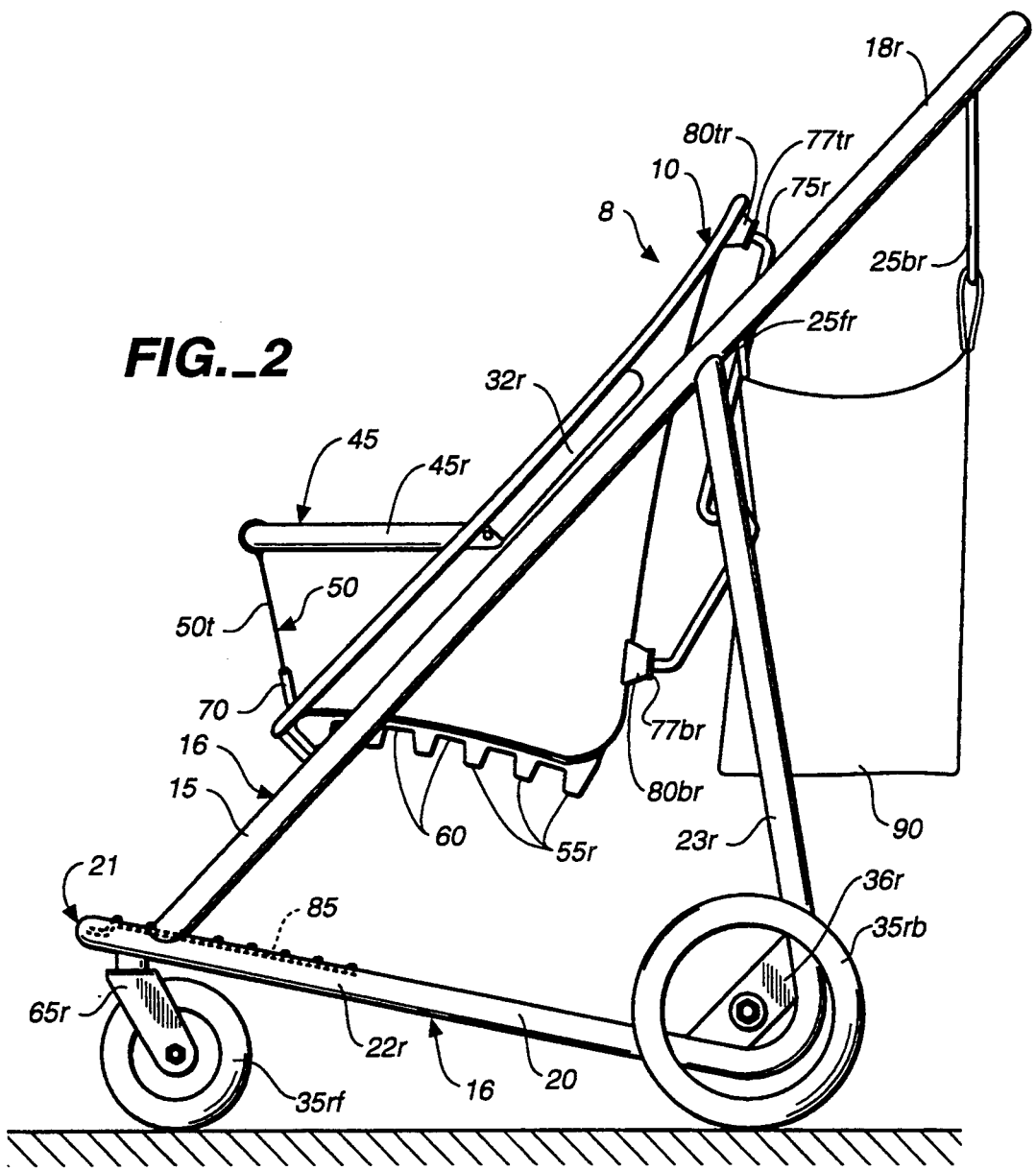

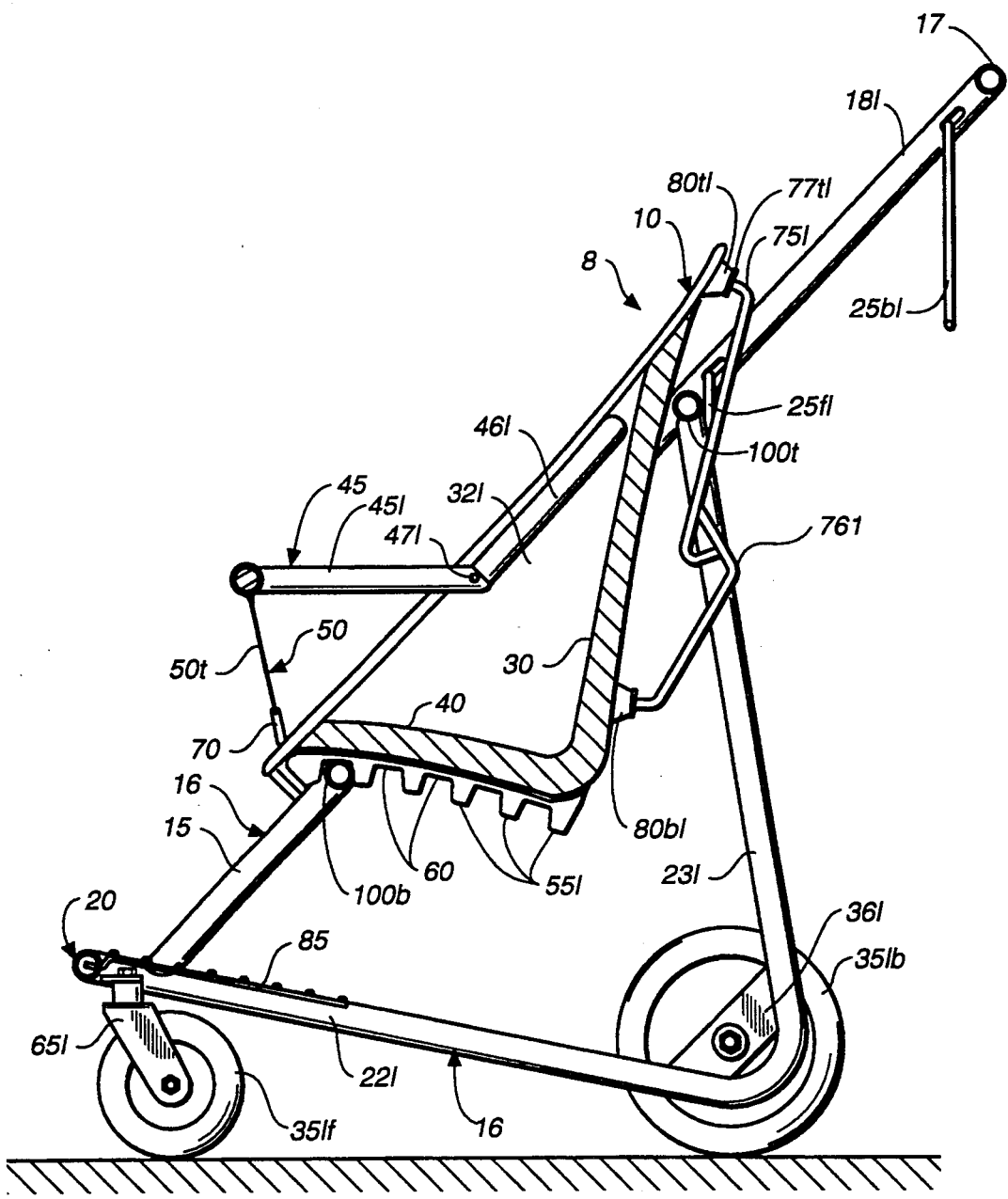
FIG._4A

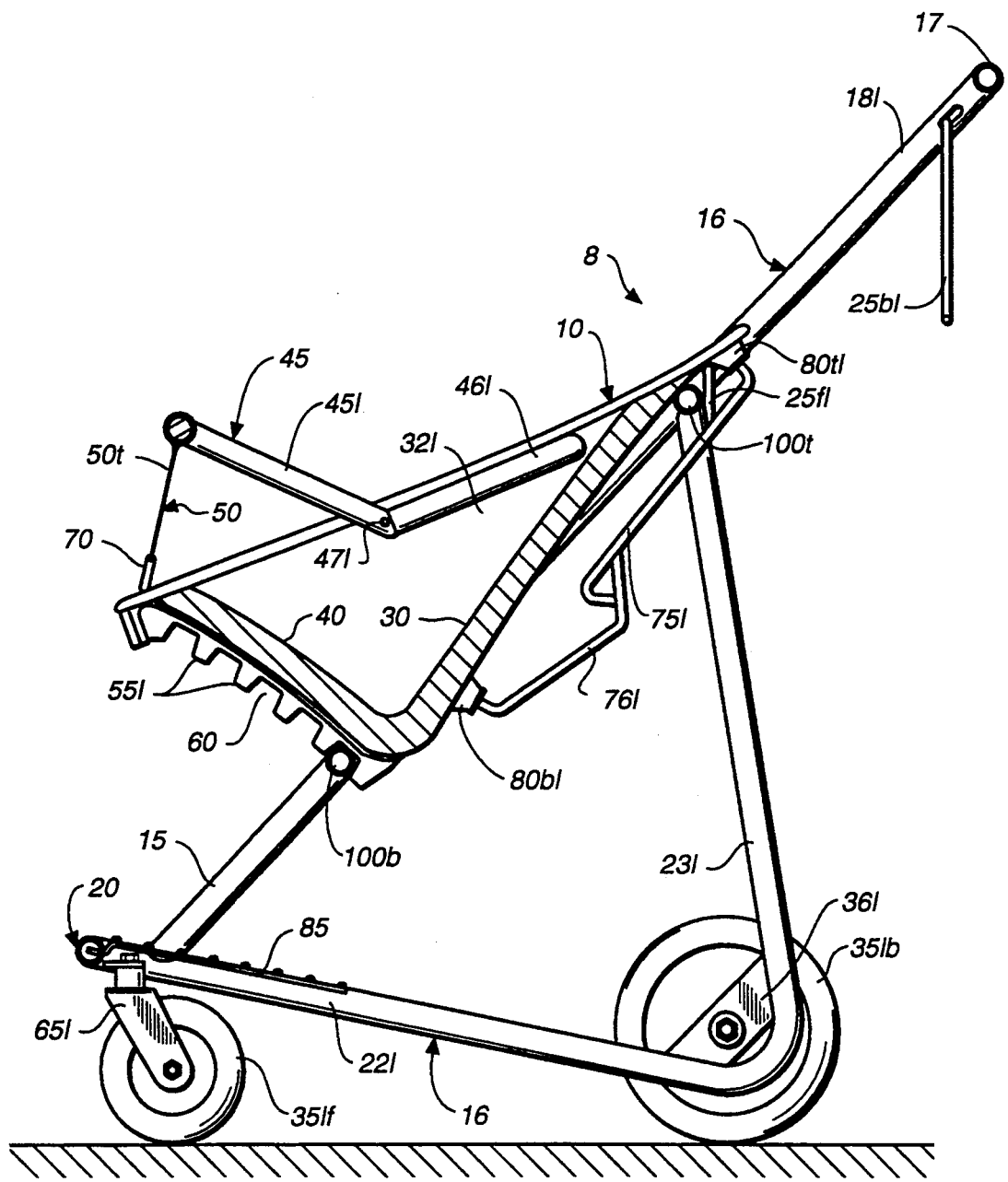
FIG._4B

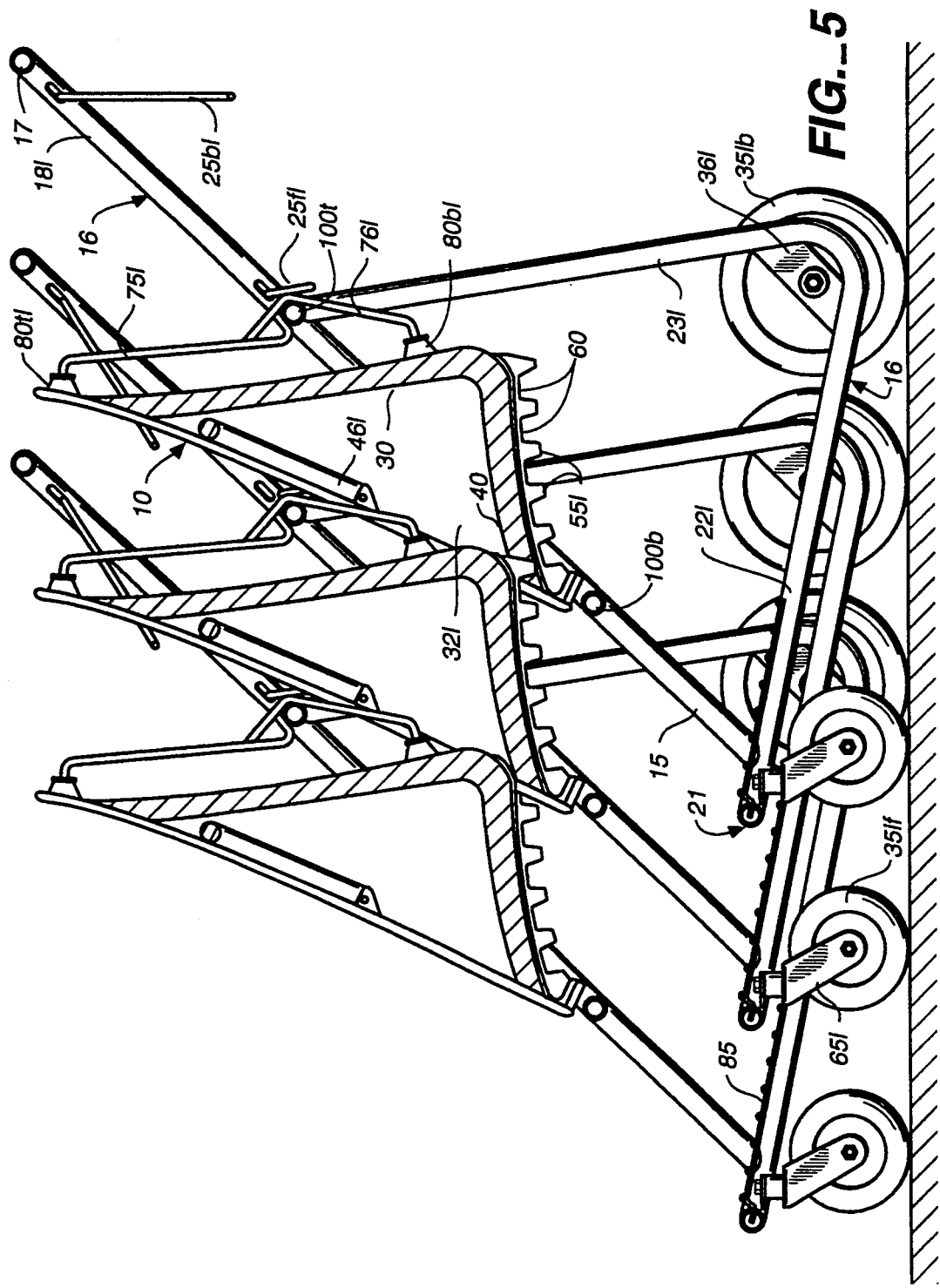
FIG._5

NESTABLE ADJUSTABLE STROLLER

BACKGROUND OF THE INVENTION

The present invention relates generally to a stroller for transporting a child, and more particularly to a stroller which also includes means for storage of articles such as groceries or other shopping goods. In particular, the present invention relates to a stroller or child carriage which includes a bag, rack, or other means for storage of goods, and which is nestable with other strollers of similar design, and in which the orientation of the seat of the stroller is adjustable.

The nestable adjustable stroller of the present invention provides a child seat consisting of only one moveable part which is adjustable in orientation, and may be easily nested with other strollers of the same design. Multiple strollers of such design may be nested with each stroller being separated by a distance equal to a wheel diameter. The stroller of the present invention has a storage compartment, particularly a storage bag, which makes the stroller useful for shopping or other tasks requiring transportation of articles or goods while transporting a child. The stroller is also provided with a footrest for the child. The seat of the stroller is provided with a means for restraining the child within the seat so that the parent or guardian need not pay constant attention to the child, and a means for easily adjusting the orientation of the seat.

An object of the present invention is to provide an adjustable stroller.

Another object of the present invention is to provide a nestable stroller.

Another object of the present invention is to provide a nestable and/or adjustable stroller having one moveable part.

Another object of the present invention is to provide a nestable adjustable stroller with means for storage of goods.

Another object of the present invention is to provide a nestable adjustable stroller with means for restraining a child in the seat.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a stroller comprising a chassis having a front, a back, and first and second engagement surfaces, a plurality of wheels rotatably mounted at the base of the chassis, a seat having third and fourth engagement surfaces, the first engagement surface being below the second engagement surface, the third engagement surface being located on the bottom of the seat, and the fourth engagement surface being located on the back of the seat. The seat is movable between at least three positions. In the first position the first engagement surface is in contact with the third engagement surface and the seat is in an upright orientation. In the second position the first engagement surface is in contact with the third engagement surface and the seat is in a reclined orientation. In the third position the second engagement surface is in contact with the fourth engagement surface and the seat is in a position which facilitates nesting of the stroller with similar strollers.

BRIEF DESCRIPTION OF THE DRAWING

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 1 is a front view of a stroller of the present invention.

FIG. 2 is a side view of the stroller.

FIG. 3 is an exploded view of the top right corner of the seat.

FIGS. 4A and 4B are cut-away side views of the stroller with the seat in the fully upright and fully reclined positions, respectively.

FIG. 5 is a cut-away side view of three nested strollers.

DESCRIPTION OF THE PREFERRED EMBODIMENTS

The present invention will be described in terms of the preferred embodiment. The preferred embodiment is a nestable adjustable stroller. Referring now to FIGS. 1 and 2, a nestable adjustable stroller 8 is shown. Stroller 8 consists of a seat 10 mounted on a chassis 16, the chassis 16 being mounted on left back wheel 35*lb*, left front wheel 35*lf*, right front wheel 35*rf*, and right back wheel 35*rb*.

Reference numerals in the description will commonly consist of a number followed by one or two letters. Similar elements which differ only in their position or orientation will share a common numerical value but will have different appended letters. For instance, the letters "l" and "r" refer to the left and right sides of the stroller 8, respectively, as viewed from the front of the stroller 8. Multiple elements of a similar type may be collectively referred to by only the number portion of the reference numeral. For instance, the four wheels 35*lb*, 35*lf*, 35*rf*, and 35*rb* will collectively be referred to with the single reference numeral 35.

The chassis 16 consists of a substantially U-shaped front chassis bar 15 and a base chassis bar 20. The front chassis bar 15 is secured to the base chassis bar 20, and both chassis bars 15 and 20 are preferably formed of metal and have substantially circular cross-sections. The front chassis bar 15 has a handle section 17 and two descending arm sections, left arm 18*l* and right arm 18*r*. The base chassis bar 20 has a nose section 21 at the front which leads to left and right lateral sections 22*l* and 22*r*, and in turn to left and right struts sections 23*l* and 23*r*. The upper ends of left and right struts 23*l* and 23*r* are secured to midpoints of left and right arms 18*l* and 18*r* of the front chassis bar 15, and the lower ends of left and right arms 18*l* and 18*r* are secured to the base chassis bar 20 near on the left and right lateral sections 22*l* and 22*r*, respectively, near the nose 21. A footrest 85 extends from the left lateral section 22*l* to the right lateral section 22*r* at the nose 21 end of the base chassis bar 20. Left and right rear wheels 35*lb* and 35*rb* are mounted on crossplates 36*l* and 36*r* which are attached to the base chassis bar 20 across the bend between lateral section 22*l* and strut 23*l*, and lateral section 22*r* and strut 23*r*, respectively. Left and right front wheel forks 65*l* and 65*r* are swivel mounted at the nose 21 end of the chassis bar 20, and left and right front wheels 35*lf* and 35*rf* are rotatably mounted in the wheel forks 65*l* and 65*r*, respectively.

The seat 10 of the stroller 8 is formed of molded plastic, and comprised of a back rest 30, a base 40, and left and right side wings 32*l* and 32*r*, respectively. Two rows of ribs, left row 55*l* and right row 55*r*, extend from the bottom of the base 40. Four dimples, top left dimple 80*tl*, top right dimple 80*tr*, bottom left dimple 80*bl*, and bottom right dimple 80*br*, are formed in the respective corners of the back rest 30. Two hanger brackets, left hanger bracket 75*l* and right hanger bracket 75*r*, are mounted on the rear side of the back rest 30. The upper portions of the hanger brackets 75 run substantially parallel to the back of the seat 10. The lower section of each hanger bracket 75 includes a J-shaped hook 76.

As shown in the exploded view of the top right-hand corner of the seat 10 of FIG. 3, the top end of right hanger bracket 75*r* is secured to the seat 10 by insertion of a threaded section 78*tr* at the tip of the hanger bracket 75*r* through a hole 81*tr* in the dimple 80*tr* so that a plate 77*tr* comes in contact with the seat 10. The countersink nut 90*tr* has a threaded indentation complementary to the threaded end 78*tr* of the hanger bracket 75*tr* and may be screwed onto the threaded end 78*rt* protruding through hole 81*tr*. The bottom end of the right hanger bracket 75*r*, and the top and bottom ends of the left hanger bracket 75*l* are secured to the seat 10 in a similar manner.

Pivotable restraining bar 45 is mounted by means of left and right pivot pins 47*l* and 47*r* (pivot pins 47*l* and 47*r* are not visible in FIGS. 1 or 2, but left pivot pin 47*l* is shown in the cross-sectional views of FIGS. 4A, 4B and 5) at the front edge of the wings 32*l* and 32*r*, respectively. The restraining bar 45 is U-shaped and has a midsection 45*m*, and left and right arms 45*l* and 45*r*, respectively. A restraining strap 50 can be used to secure the restraining bar 45 in the horizontal position. The restraining strap 50 consists of a top portion 50*t* attached to the midsection 45*m* of the restraining bar 45 and a bottom portion 50*b* which attached by a screw mount to the front end of the seat base 40. The top and bottom portions of the strap 50*t* and 50*b* may be joined by buckle 70, and when joined the restraining bar 45 is secured in the horizontal position as shown in FIGS. 1 and 2. When the buckle 70 is not secured, the restraining bar 45 may be rotated from the horizontal position to a position where the arms 45*l* and 45*r* of the restraining bar 45 are seated in left and right depressions 46*l* and 46*r* in left and right wings 32*l* and 32*r* of the seat 10, respectively. With the restraining bar 45 seated in the depressions 46, the height of the midsection 45*m* of the bar 45 will generally be above the top of the head of a child seated in the stroller 8, thereby allowing a child to sit comfortably.

As shown clearly in FIG. 2, stroller 8 has a storage bag 90 which hangs from the front chassis bar 15 near the handle 17. The bag 90 is preferably made of an open mesh plastic, and therefore the bag 90 may be cleaned by hosing down the stroller 8, and the contents of the bag are visible to prevent shoplifting. The bag 90 hangs from the front chassis bar 15 by back left and right bag supports bars 25*bl* and 25*br*, and front left and right bag supports bar 25*fl* and 25*ft*. The support bars 25 are mounted in the front chassis bar 15 by insertion of horizontal portions of the upper ends of the support bars 25 through small horizontal holes in the front chassis bar 15. The support bars 25 are rotatable in a forward and backward direction.

Referring now to FIGS. 4A and 4B, the stroller 8 is shown in cross section with the seat 10 in the fully upright and fully reclined positions, respectively. Note that for clarity bag 90 is not shown in FIG. 4. Top and bottom crossbars 100*t* and 100*b* are substantially horizontal, extending from the left strut 23*l* to the right strut 23*r* of the front chassis bar 15. The crossbars 100 are welded to the front chassis bar 15 and are separated by a distance of approximately 1.5″. The seat 10 is constrained to the chassis 16 by the hanger brackets 75 which, together with the rear surface of the seat 10, encircle the top crossbar 100*t*.

In the fully upright position the bar 100*b* rests in a groove 60 between the front two ribs of both rows of ribs 55 and the majority of the weight of the seat 10, and any occupants or contents of the seat 10, rests on the bottom crossbar 100*b*. The weight of the seat 10 and the occupant or any contents in the seat 10 provides a torque which brings the rear surface of the backrest 30 into contact with the upper crossbar 100*t*.

Seat 10 may be moved from the fully upright position to the fully reclined position by lifting the seat 10, moving the front of the seat forward and resting the lower cross-bar 100*b* in the grooves 60 between the last two ribs of both rows of ribs 55*l* and 55*r*. Again, the weight of the seat 10 and the occupant or any contents in the seat 10 provides a torque which brings the rear surface of the backrest 30 into contact with the upper crossbar 100*t*. The seat 10 can also be positioned in a plurality of orientations intermediate between the fully upright and fully reclined positions by seating the crossbar 100*b* in the grooves 60 between any pair of ribs 55.

FIG. 5 is a cross-sectional view of three strollers 8 of the present invention in the nested configuration. Although three strollers 8 are shown in the figure, reference numerals are only provided for the right-most stroller 8 for clarity. In the following text, the same reference numeral will be used to refer to corresponding parts of any of the three strollers 8 of FIG. 5. Because the lateral sections 22 of the base chassis bar 20 slope upward and inward from back to front, and because the rear bag supports 25*br* and 25*bl* pivot forward, strollers 8 may be nested so that each stroller 8 is displaced from the adjacent strollers 8 by a distance equal to the diameter of the rear wheels 35*lb* and 35*rb*. To nest the strollers, the seat 10 is lifted so that the weight of the seat 10 is supported by the hook sections 76 of the hanger brackets 75 which rest on the upper crossbar 100*t*. The radius of curvature of the hook sections 76 is substantially equal to the cross-sectional radius of the upper crossbar 100*t*. This seat position is termed the hanging position. The restraining bars 45 must also be raised from their horizontal positions, preferably to be seated in depressions 46 as described above, prior to nesting, since the back of one seat 10 fits into the seat cavity of an adjacent stroller seat when the strollers 8 are in the nested configuration.

When the strollers 8 are in the nested configuration the back bag supports 25*bl* and 25*br* pivot forward and the bag 90 (not shown in FIG. 5 for clarity) of a nested stroller 8 rests between the upper crossbar 100*t* of the stroller and the seat 10 of the adjacent stroller 8.

The strollers 8 may be separated from each other when in the nested position by a lateral outward force on adjacent handles 17. To reposition the seat 10 from the hanging position to the seating position, the seat 10 is lifted so that the hooks 76 no longer rest on the upper crossbar 100t. The seat 10 is then lowered so that the lower crossbar 100b lodges in one of the grooves 60. In the nested position lower crossbar 100b does not support the seat. The restraining bar 45 may then be lowered and the top restraining strap 50t may optionally be secured to the bottom restraining strap 50b by engaging the buckle 70. The child may then be put into the seat 10. Goods may be stored in the bag 90.

In summary, a nestable adjustable stroller having a single moving piece has been described. The present invention has been described in terms of a preferred embodiment. The invention, however, is not limited to the embodiment depicted and described. Many variations are possible. For instance: the chassis may have a different configuration; the wheels may be mounted to the chassis in a different manner; other means of adjustable engagement between the seat and the chassis may be implemented, such as substituting a series of ribs and grooves for the lower chassis crossbar and substituting a crossbar for the ribs and grooves on the bottom of the seat, or substituting a U-shaped hook for the hanger brackets; the seat may have a different shape; the stroller may not include a restraining bar; the hanger brackets may have a different shape or may be attached to the seat by a different means; the seat may not be provided with a restraining bar, a restraining strap, or a restraining bar depression; the bag may be replaced with a different storage means; the bag may be secured to the chassis in a different manner or at a different location; the footrest may extend from the nose to the rear of the lateral section of the chassis bar; or there may be a greater or lesser number of ribs at the bottom of the seat.

Accordingly, the scope of the invention should be determined not by the embodiment illustrated, but by the appended claims and their legal equivalents.

What is claimed is:

1. A stroller, comprising:
   a chassis having a front end and a rear end;
   a first engagement surface mounted on said chassis;
   a second engagement surface mounted on said chassis above said first engagement surface;
   a plurality of wheels rotatably mounted on said chassis; and
   a seat adjustably constrained to said chassis and having a base, a backrest, a third engagement surface on said base permitting releasable engagement with said first engagement surface such that the orientation of the entirety of said seat relative to said chassis may be changed, and a fourth engagement surface on said backrest, said seat being movable between first, second, and third stable positions, in said first position said first engagement surface contacts said third engagement surface at a first location and said seat is in a relatively upright position, in said second position said first engagement surface contacts said third engagement surface at a second location and said seat is in a more reclined orientation than in said first position, and in said third position said second engagement surface is in contact with said fourth engagement surface such that a portion of said base is closer to said rear end than when in said second position and said stroller may be nested with another stroller of similar construction.

2. The stroller of claim 1 wherein in said first and second positions said seat is substantially supported by contact between said first and third engagement surfaces.

3. The stroller of claim 1 wherein in said third position said seat is substantially supported by contact between said second and fourth engagement surfaces.

4. The stroller of claim 1 wherein said first engagement surface comprises a first substantially horizontal bar and said third engagement surface comprises a series of ridges on a bottom surface of said base.

5. The stroller of claim 4 wherein said first horizontal bar and each of said ridges are substantially parallel.

6. The stroller of claim 1 wherein said second engagement surface comprises a second substantially horizontal bar and said fourth engagement surface has a radius of curvature substantially equal to a cross-sectional radius of said second bar.

7. The stroller of claim 1 wherein said second engagement surface comprises a second substantially horizontal bar and said fourth engagement surface comprises a bracket extending from a rear surface of said backrest, said bracket having a hook section with a radius of curvature substantially equal to a cross-sectional radius of said second bar.

8. The stroller of claim 7 wherein said first engagement surface comprises a first substantially horizontal bar and said third engagement surface comprises a series of ridges on a bottom surface of said base, said first horizontal bar and each of said ridges being substantially parallel.

9. The stroller of claim 8 further comprising a restraining bar extending across said seat.

10. The stroller of claim 9 further including a storage bag suspended from said chassis.

11. The stroller of claim 1 wherein said third engagement surface includes first and second grooves in said base, said first groove being at said first location and said second groove being at said second location.

12. The stroller of claim 1 wherein said backrest is at a fixed orientation relative to said base.

13. The stroller of claim 12 wherein said base and said backrest are integrally-formed.

* * * * *